United States Patent [19]

Seifert et al.

[11] 4,307,852

[45] Dec. 29, 1981

[54] ROLL-UP DEVICE FOR SAFETY BELT

[75] Inventors: Helmut Seifert, Schwäbisch Gmünd; Wolf-Dieter Hönl, Mutlangen; Johannes Schmid, Schwäbisch Gmünd; Bernhard Frey, Waldstetten, all of Fed. Rep. of Germany

[73] Assignee: REPA Feinstanzwerk GmbH, Alfdorf, Fed. Rep. of Germany

[21] Appl. No.: 59,636

[22] Filed: Jul. 23, 1979

[30] Foreign Application Priority Data

Jul. 21, 1978 [DE] Fed. Rep. of Germany ....... 2823160

[51] Int. Cl.³ ...................... A62B 35/02; B65H 75/48
[52] U.S. Cl. ............................................ 242/107.4 A
[58] Field of Search ........................... 242/107–107.7; 280/803, 806–807; 297/474–478

[56] References Cited

U.S. PATENT DOCUMENTS

| 3,495,786 | 2/1970 | Hemans | 242/107.4 B |
| 3,552,676 | 1/1971 | Weber | 242/107.4 A |
| 3,905,562 | 9/1975 | Kell | 242/107.4 A |
| 4,136,841 | 1/1979 | Fohl | 242/107.4 R X |
| 4,177,962 | 12/1979 | Hildebrant | 242/107.4 B |
| 4,223,853 | 9/1980 | Ernst | 242/107.4 R |

Primary Examiner—John M. Jillions
Attorney, Agent, or Firm—Herbert L. Lerner

[57] ABSTRACT

Roll-up device for a safety belt with a mechanism for blocking the belt shaft in case of a crash. Blocking is effected by locking pawl means coupled with the belt shaft and activated by release mechanism. The belt shaft has two sets of bearings (a) the belt shaft is supported by bearings with little play and little friction and which are elastically yielding to high pull forces which occur in case of a crash, and (b) the belt shaft is simultaneously centered in stable load bearings of the basic frame with radial bearing play on all sides.

1 Claim, 7 Drawing Figures

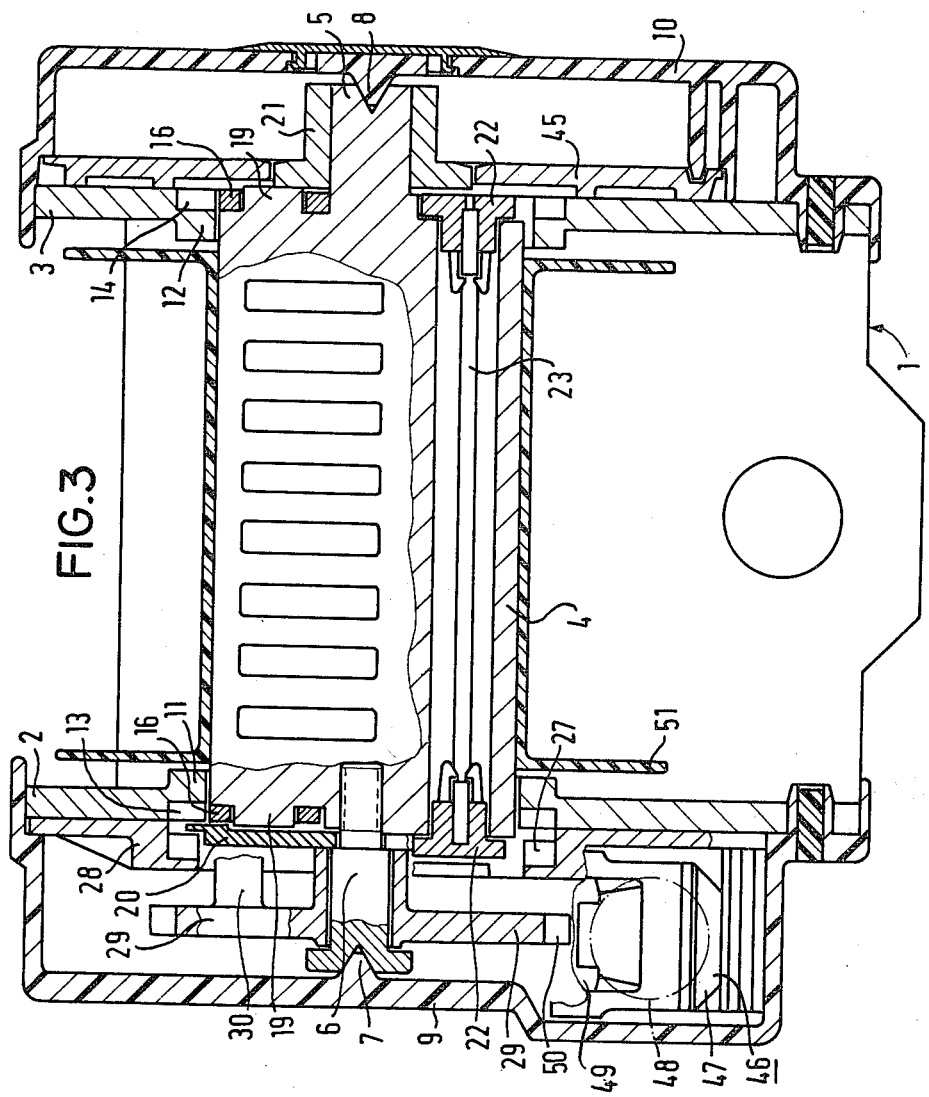

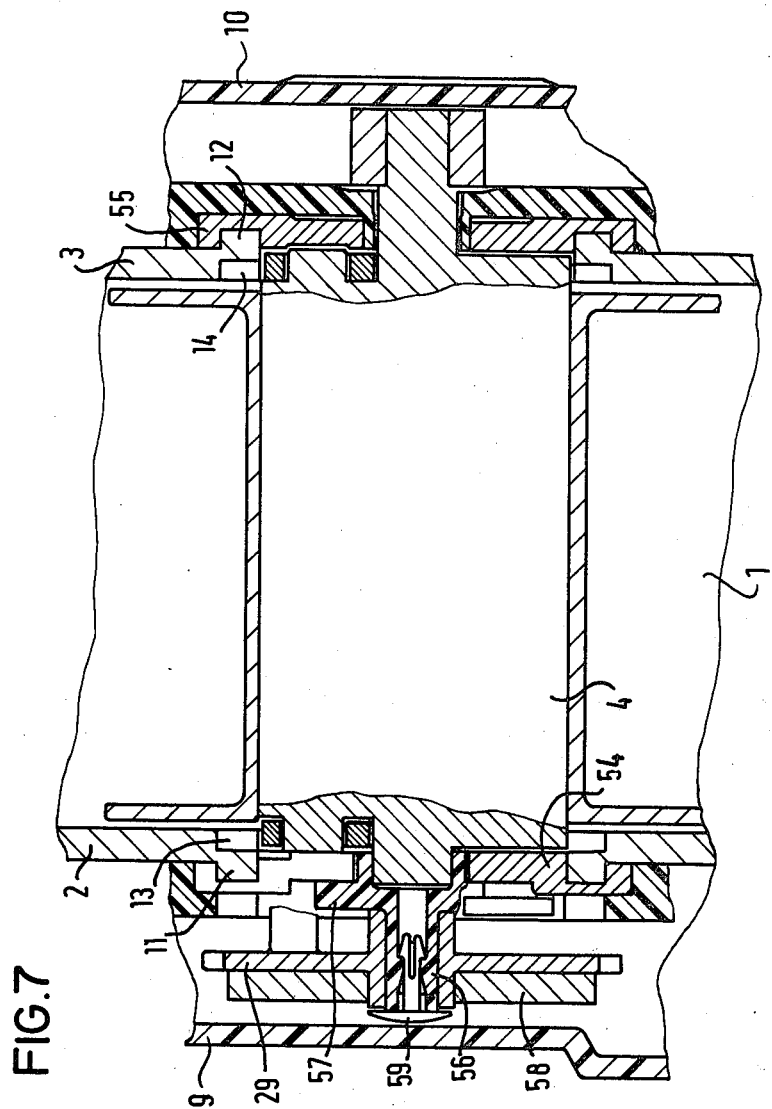

ROLL-UP DEVICE FOR SAFETY BELT

CROSS-REFERENCE TO RELATED APPLICATION

Our application Ser. No. 59,624, filed on 7/23/79, assigned to REPA Feinstanzwerk GmbH, the assignee of the present invention.

BACKGROUND OF THE INVENTION

1. Field of the Invention

The invention relates to a roll-up device for a safety belt for a motor vehicle with a mechanism for blocking the belt shaft in case of a crash. The belt shaft is provided with a locking pawl device that can be operated by a release mechanism, which can be coupled with the belt shaft supported in stable bearings of the basic frame of the roll-up device.

2. Description of the Prior Art

In known roll-up devices for safety belts of the above-mentioned type, (U.S. Pat. No. 3,901,459) a roll-up spring is arranged on one side of the belt shaft, while the opposite shaft end is connected with a locking pawl device and a release mechanism. In case of danger, i.e. at an acceleration or deceleration which exceeds a permissible limit, the release mechanism which, for example, is provided with inertial mass, acts upon a control disc and the control disc effects, through a locking pawl, the blocking of the belt shaft. The locking pawl and with it, locking teeth which are disposed in the same plane as the locking pawl, are arranged adjacent to the side plates of the U-shaped basic frame, while the load-bearings for the belt shaft are located in the stable side plates. For reasons of stability, the bearings which have a relatively large bearing diameter, have to be very accurately manufactured in order to avoid, during normal operation of the roll-up device for the safety belt i.e. when attaching or detaching the safety belt, high bearing friction and annoying bearing noises when the belt is rolled up. The manufacture of such load bearings is very costly and yet do not achieve desired advantages with respect to operation and low noise.

SUMMARY OF THE INVENTION

An object of the present invention is to provide a roll-up device for a safety belt of the above-mentioned type that has functional safety and comfort with respect to the rolling property of the belt shaft and the belt spool and can be constructed simply and economically.

With the foregoing and other objects in view, there is provided in accordance with the invention, a roll-up device for a safety belt in a motor vehicle having a frame, a rotatable belt shaft on which a safety belt is wound, locking pawl means with locking teeth and a locking pawl for blocking the belt shaft, said locking pawl means activated by a control element operable by a release mechanism which is triggered when the vehicle exceeds a permissible acceleration or deceleration, said belt shaft supported in first bearings with little play and little friction with said first bearings yielding to high pull forces which occur due to blocking of the belt shaft, said belt shaft simultaneously centered in second stable load bearings of the frame with radial bearing play on all sides whereby when said first bearings yield, said second stable load bearings absorb the high pull forces. Other features which are considered as characteristic for the invention are set forth in the appended claims.

Although the invention is illustrated and described herein as embodied in a roll-up device for safety belts, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which

FIG. 3 is a detailed representation shown in a longitudinal sectional view of a roll-up device for safety belts according to FIGS. 1 and 2;

FIG. 7 is a sectional view of a further embodiment of a roll-up device for safety belts with locking means from inside toward the outside.

DETAILED DESCRIPTION OF THE INVENTION

Figure 2:
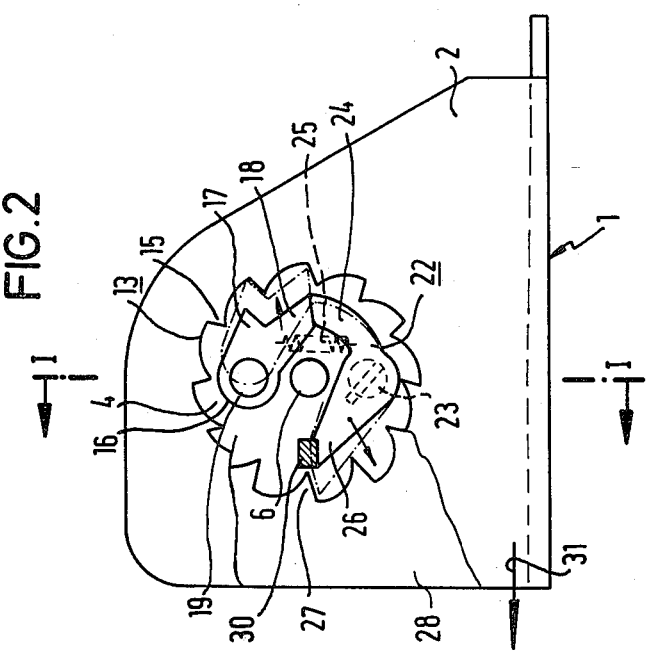
FIG. 2 is a side view of the roll-up device shown in FIG. 1.

According to the invention, the belt shaft is supported without play and with low friction, preferably in elastically yielding supports, with respect to the high pulling forces which occur in the case of a crash, and is, at the same time, centered in stable load bearings of the basic frame with radial bearing play on all sides. The bearings are made as synthetic-material bearings with a small bearing diameter to reduce the bearing friction moment and noise. Due to the friction-less support of the belt shaft with little play in conical bearings or in bearing openings of plastic plates with a small diameter, the rolling properties of the belt shaft are extremely good at normal use i.e. when attaching or detaching the safety belt or when adjusting the attached safety belt. The parts that form the bearings are very inexpensive, and can, for example, be made by injection molding of plastic. In the case of a crash i.e. if the total mass of the person that is to be protected, acts on the safety belt, the above-mentioned bearings yield and the total pull force is absorbed by the stable load bearings of the basic frame. These load bearings can also be made in a very inexpensive manner, for example, by a simple stamping process without additional upgrading of the bearing surface, which previously was necessary in the known roll-up devices for safety belts. In this manner, the basic frame of the roll-up device, including the perforations for the load bearing, can be made in a one-piece stamping.

In a preferred embodiment of the invention, conical bearings are provided on both sides in the plastic covers, which covers can be fastened to the basic frame.

These conical bearings, together with the side covers, can be produced in an injection or stamping process. By the use of the conical bearings for the fine bearing of the belt shaft, the result is very low bearing friction moments combined with low noise when operating the safety belt.

The assembly of the roll-up device for a safety belt is facilitated by connecting the belt shaft with a shoulder-screw at at least one side of the shaft. The shoulder-screw at its free end is provided with a bearing notch for the conical bearing. A control disc supported on the shoulder-screw acts together with the release mechanism for operating the locking pawl device.

In a further embodiment of the invention, sleeve bearings with a small bearing diameter are provided. To provide a certain elasticity, i.e. capability to yield, of the bearing in case of a crash, the bearing openings have perforations which surround the bearing plates making the bearings capable of yielding under load. These perforations can have the shape of ring sections, elongated slots, or equalizing slits, which permit a yielding of the bearing in the direction of the pulling force. With a decrease of the extreme pulling force after a crash, the mentioned bearings spring back and the belt shaft goes into its centered position with respect to the load bearing.

Perforations in the side plates of the basic frame of the roll-up device serve as load bearings. A locking pawl device may be disposed in at least one of these perforations. The locking pawl device can be so constructed that it operates either from the outside toward the inside or from the inside toward the outside, and can be coupled with locking tooth means. In addition to the explained improved rolling of the belt shaft, there is obtained by the integration of the locking pawl mechanism into the side plates of the frame of the roll-up device, a roll-up device of small width. In addition, the shearing forces which occur under load in systems where the locking pawl mechanisms are arranged outside of the side plates are avoided.

Advantageous details of the invention are illustrated embodiments shown in the drawings and described in the following.

Figure 1:
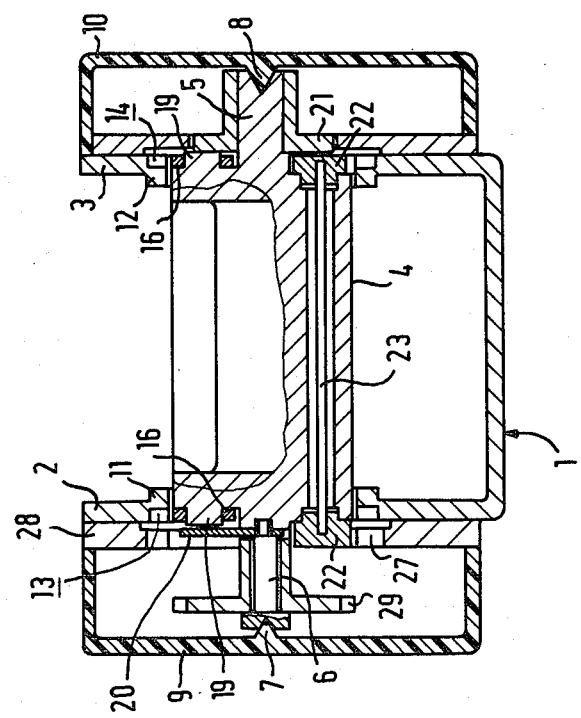
FIG. 1 is a schematic representation of the first embodiment of the roll-up device for safety belts according to the invention with locking means from inside toward the outside in a sectional view taken along line I—I of FIG. 2.
Figure 4:
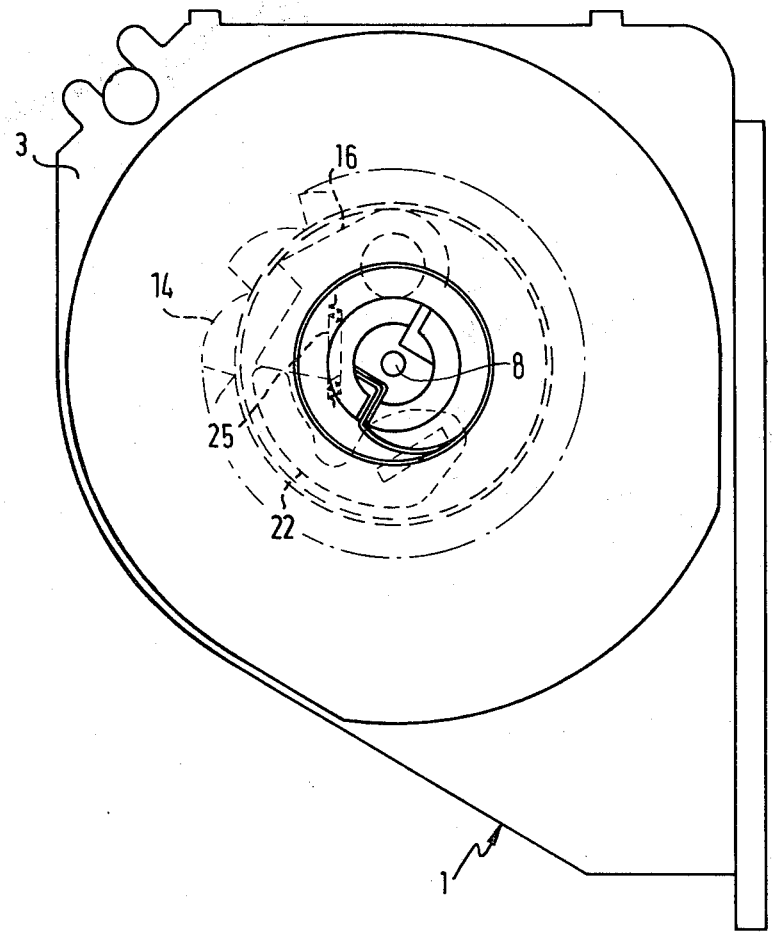
FIG. 4 is a side view of the roll-up device of FIG. 3 viewed from one side.

In the schematically shown embodiment according to FIGS. 1 and 2, a metallic U-shaped basic frame is designated as numeral 1, and the side plates with numerals 2 and 3. The roll-up shaft of the belt 4 is provided with projections 5 and 6 at opposite sides. Projections 5 and 6 extend beyond the side plates 3 and 2 and have axial bearing notches in which the roll-up shaft 4 in bearing centers 7 and 8 of plastic covers 9 and 10 is supported without play. The bearing notches, in conjunction with the bearing centers 7 and 8, form conical bearings which, though they cannot withstand the high radial loads when the belt shaft is blocked in case of a crash, permit a friction-free and accurate bearing support of the belt shaft when it is normally used, for example, when attaching and detaching it, and also produce little noise. The bearings can be made very economically, for example, as plastic injection moldings. In the embodiment according to FIGS. 3 to 5 in which there is also a bearing of small diameter, such bearing may similarly be manufactured by injection molding. In the embodiment according to FIGS. 1 and 2, the side plates are provided with pulled-in or offset bearings 11 and 12, in which the belt shaft 4 is supported with radial play at the shaft circumference. In the plane of the bearing offsets, the side plates 2 and 3 are provided with internal locking teeth 13, 14 which are integrated within the plate thickness and have sawtooth-shaped locking teeth 15. The locking teeth, in case of a crash and locking, work together with the locking pawl 16. The one-armed locking pawls 16 are each provided with two locking teeth 17, 18 and are supported on the bearing shoulder 19 of the belt shaft 4 and secured in the required position by retainer plate 20 and flanged collar 21. A two-armed control lever 22 is also rotatably supported at both shaft ends of the belt shaft 4. Both control levers 22 are in fixed connection with each other by a rod 23 which is rotatably supported inside the belt shaft 4. Each control lever 22 is provided with an operating projection 24 which functions together with a slide-surface of the locking pawl 16, and is tensioned against the locking pawl 16 by means of a spring 25. When the control lever 22 is hinged in the direction of the arrow (FIG. 2), a locking tooth 26 is provided which locks into the inner teeth 27 of a tooth plate 28 which is attached to the sideplate 2. The mentioned motion of the control lever 22, and thereby of the locking pawls 16 into the lock-position is caused by a control-or inertia disc 29 with coupling cog 30. Disc 29 is rotatably supported on projection or pin 6 of the belt shaft 4. Disc 29 is stopped for at least a moment by a release mechanism (which is not shown in FIG. 1 and will be described later) in case of an extreme positive or negative acceleration of the vehicle in which the automatic roll-up device for a safety belt is used, and which causes a motion of the control lever 22 and thereby also a motion of the locking pawls 16 against the force of spring 25. In this situation, i.e. when the weight of the passenger which is to be protected acts on the belt and the belt shaft in the direction of the arrow 31, the conical bearings 7/8 yield, and the total pulling forces are absorbed by the coarse bearings 11, 12 of the stable basic frame 1. Thereby, a very short time is required to lock the belt because the path of motion from the inside toward the outside is very short.

Figure 5:
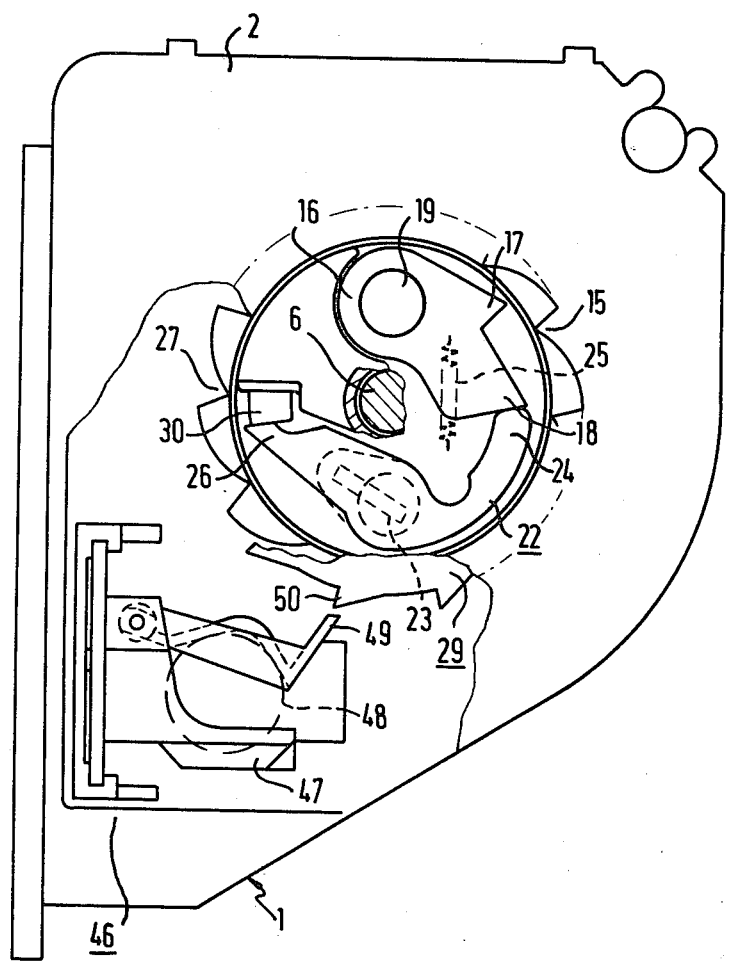
FIG. 5 is a side view of the roll-up device of FIG. 3 viewed from the other side.

In the sample embodiment according to the FIGS. 3 to 5, 6 and 7, the parts which functionally coincide with the corresponding parts in FIGS. 1 and 2, are designated by the same reference numbers. In the embodiment according to FIGS. 3, 4 and 5, similar to the embodiment according to FIGS. 1 and 2, the side plates 2 and 3 have bearings 11, 12, set-off toward the inside, and are provided each with locking tooth means 13, 14 open towards the outside. The locking tooth means 13, 14, which act together with locking pawls 16 to block the belt shaft 4, are integrated within the side plates 2 and 3. The locking tooth means 13, 14 are partly covered by the retainer plates 20, 21. The retainer plate 21 serves as a stud for supporting a roll-up spring which is not shown, and which is disposed in the free space between a buffer disc 45, adjacent to side plate 3, and the cover 10. In FIG. 3, one can clearly see the conical bearings 7/8. Also clearly shown in FIGS. 3 and 5 is the previously-mentioned release mechanism consisting of a dish 47 which is open on top, a massive sphere or ball 48, and a control lever 49 with its free arm extending upward, resting loosely on ball 48. In case of danger i.e. when the vehicle is accelerated beyond a predetermined limit, the arm is moved upward by the motion of ball 48, and engages with the outer teeth 50 of control disc 29, and stops the latter at least for a short time. Thereby, the control cog 30 of the control disc 29 moves the control levers 22 which are connected together, and also moves the locking pawl 16 into the locked position. It can also be seen from FIG. 3 that the roller shaft 4 carries a belt pulley (spool) 51 with side flanges. The Figures show clearly that the release mechanism 46 is supported on the tooth-or support plate 28 which comprises the inner teeth 27 for the control lever 22. The bearing projection 6 is made as a shoulder screw which is screwed into a female thread of the belt shaft body. This shoulder screw has the bearing indentation for the conical bearing 7.

Figure 6:
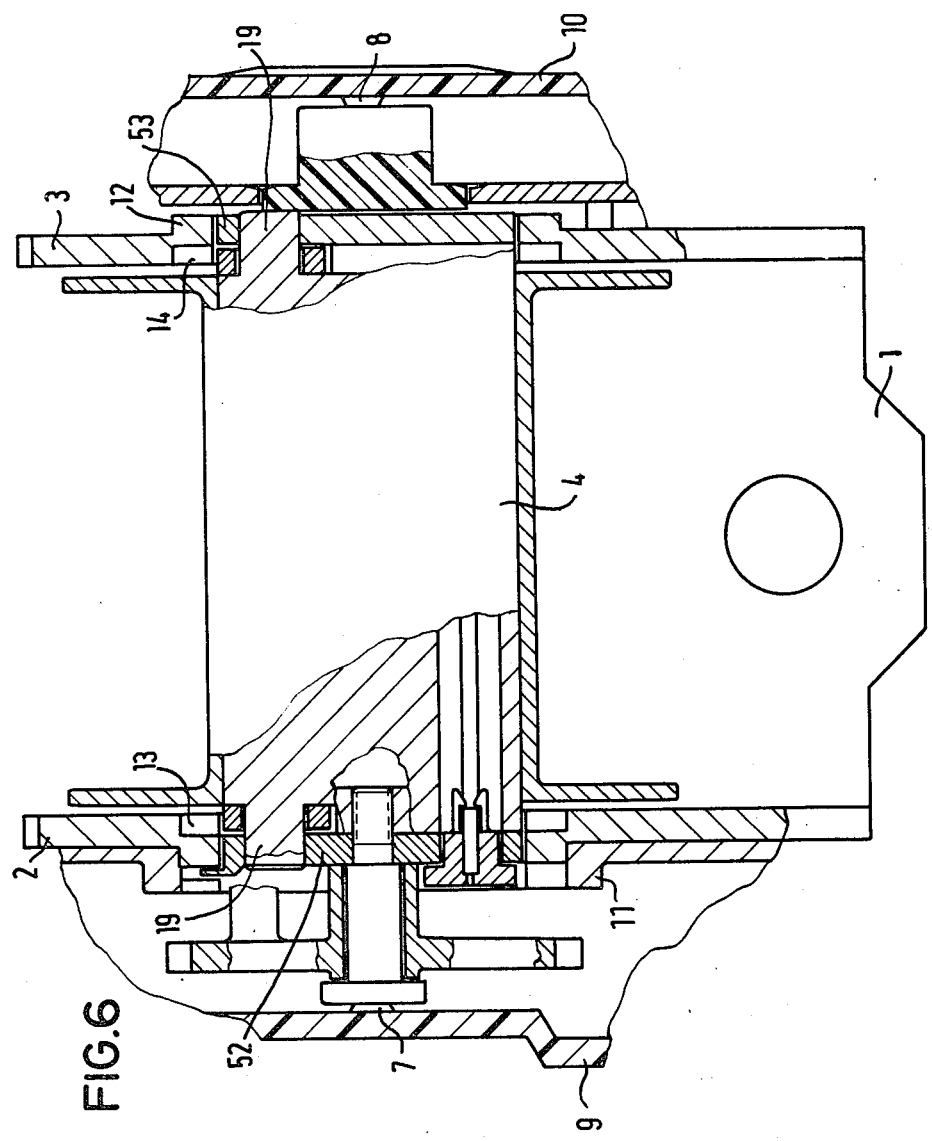
FIG. 6 is a sectional view of another embodiment of the roll-up device shown in FIGS. 1 and 2.

In the embodiment according to FIGS. 6 and 7, only those parts of the roll-up device for a safety belt are shown which are essential for understanding the device. In contrast to the embodiments according to FIGS. 3 to 5, the bearings 11 and 12 of the side plates 2 and 3 of the U-shaped basic frame 1 are set-off toward the outside so that the locking teeth 13, 14 are accessible from the inside. In the embodiment according to FIG. 6, the bearing extensions 19 of the belt shaft 4 extend on both sides of shaft 4 through bearing discs 52 and 53 and serve as driver elements. In contrast to this, in the embodiment according to FIG. 7, the bearing discs 54 and 55 enclose the outside of set bearings 11 and 12 of the side plates 2 and 3 with annular slot-like peripheral rims. The support of the belt shaft 4 is here only effected by the bearings 11 and 12 in which the bearing discs 54 and 55 are supported. The control disc 29 is supported on a plastic bearing shell or hub 56 having a bearing flange 57 and is provided with an inertia disc 58. Control disc 29 and inertia disc 58 are secured inside of the bearing flange 57 by a lockable retainer 59 with some spring elements.

There are claimed:

1. Roll-up device for a safety belt in a motor vehicle having a frame, a rotatable belt shaft on which a safety belt is wound, locking pawl means which include locking teeth and a locking pawl for blocking the belt shaft, a control element and a release mechanism, said locking pawl means activated by said control element operable by said release mechanism which is triggered when the vehicle exceeds a permissible acceleration or deceleration, said belt shaft supported in first conical bearings with little play and little friction with said first conical bearings yielding to high pull forces which occur due to blocking of the belt shaft, said belt shaft simultaneously centered in second stable load bearings of the frame with radial bearing play on all sides whereby when said first conical bearings yield, said second stable load bearings absorb the high pull forces, a plastic cover secured to each side of said frame, and said conical bearings made of a synthetic material extending from the plastic covers and and seating in bearing notches of the belt shaft, said belt shaft connected with a shoulder screw screwed into a female screw of the belt shaft on at least one side of the shaft, which shoulder screw has a head that has a bearing indentation for the conical bearing, a control element disposed on and supported by the shoulder screw, which control element acts in conjunction with the release mechanism and serves to operate the locking pawl mechanism.

* * * * *